United States Patent [19]

Huang

[11] Patent Number: 5,665,137
[45] Date of Patent: Sep. 9, 1997

[54] METHOD FOR CONTROLLING SECONDARY FOAM DURING GLASS MELTING

[75] Inventor: Jianzhong Huang, Westerville, Ohio

[73] Assignee: Owens-Corning Fiberglas Technology, Inc., Summit, Ill.

[21] Appl. No.: 515,412

[22] Filed: Aug. 15, 1995

[51] Int. Cl.$^6$ ................................................ C03B 5/16
[52] U.S. Cl. .................. 65/134.1; 65/134.4; 65/134.5; 65/134.9; 65/135.1
[58] Field of Search .......................... 65/134.1, 134.4, 65/134.5, 134.3, 134.9, 135.1, 135.2, 135.9, 136.2, 335, 346, 347

[56] References Cited

U.S. PATENT DOCUMENTS

| | | | |
|---|---|---|---|
| 2,331,052 | 10/1943 | Shadduck | 65/134.4 |
| 2,773,111 | 12/1956 | Arbeit et al. | 65/134.9 |
| 2,829,959 | 4/1958 | Knoppel . | |
| 3,249,402 | 5/1966 | Smyers et al. . | |
| 3,350,185 | 10/1967 | Rough | 65/134.4 |
| 3,353,941 | 11/1967 | Hanks et al. | 65/134.4 |
| 3,649,235 | 3/1972 | Harris | 65/134.9 |
| 3,716,349 | 2/1973 | Deeg et al. | 65/134.5 |
| 3,763,052 | 10/1973 | Deeg et al. . | |
| 3,869,270 | 3/1975 | Brungs et al. | 65/134.3 |
| 3,941,585 | 3/1976 | Hauser et al. . | |
| 3,960,532 | 6/1976 | Lazet | 65/134.5 |
| 4,019,888 | 4/1977 | Verhappen et al. | 65/134.5 |
| 4,022,628 | 5/1977 | Deeg . | |
| 4,042,410 | 8/1977 | Ito . | |
| 4,054,434 | 10/1977 | Thomas et al. . | |
| 4,433,995 | 2/1984 | Toussaint | 65/135.9 |
| 4,545,800 | 10/1985 | Won et al. . | |
| 4,594,089 | 6/1986 | Kurata | 65/135.9 |
| 4,632,687 | 12/1986 | Kunkle et al. . | |
| 4,957,527 | 9/1990 | Hnat . | |
| 5,173,212 | 12/1992 | Speit et al. . | |

*Primary Examiner*—Steven P. Griffin
*Attorney, Agent, or Firm*—C. Michael Gegenheimer; Inger H. Eckert

[57] ABSTRACT

A method for controlling secondary foam in a glass melting process is provided in which an oxidizing agent is added to a second melt region (32) of a glass furnace (14) where secondary foam (52) is formed. The oxidizing agent may be supplied directly to the second melt region (32) or may be added to the molten glass composition (46) with the batch raw materials (44) in a first melt region (30). When added directly, the oxidizing agent is preferably an oxidizing gas. When added with the batch materials (44), the oxidizing agent is a high temperature oxidizing agent which is inactive in the first melt region (30) yet active in the second melt region (32).

20 Claims, 3 Drawing Sheets

METHOD FOR CONTROLLING SECONDARY FOAM DURING GLASS MELTING

TECHNICAL FIELD

This invention relates to a method for controlling secondary foam in a glass melting process, and more particularly for controlling secondary foam in a glass melting process by the addition of oxidizing agents to the glass melt.

BACKGROUND ART

An increasing demand for glass fibers for insulation, reinforcement and various other applications has led to an increased demand for suitable molten glass compositions from which such fibers may be made. Molten glass compositions are typically formed from powdered or ground raw materials such as compounds of inorganic oxides, carbonates and nitrates. These powdered materials are melted to form a glass melt of a molten glass composition. When the constituents are completely molten and the composition homogenized, the molten composition is passed to a spinner or bushing for the production of glass fibers.

The individual constituents of the glass composition are generally added to the glass melt in the form of ores or bulk raw materials. These bulk materials quite frequently contain small amounts of impurities or contaminants, including carbon containing compounds and iron ($Fe^{+2}$) compounds. To help control the level of carbon and iron containing compounds in the glass melt, sodium sulfate is added. While sodium sulfate helps control the levels of iron and carbon in the glass melt, secondary foam is increased to an undesirably high level in the glass melt by the generation of $SO_2$ gas.

Processes for reducing foam have been known. U.S. Pat. No. 4,042,410 to Ito teaches a method for defoaming molten slag. Ito throws a molding consisting primarily of an organic material into the molten slag. The molding serves both to generate gas and as a heavy weight which enters the slag simultaneously with its throwing to defoam the slag. However, such a defoaming process would be unsuitable for molten glass compositions as gas generation is increased not reduced.

Accordingly, a need remains for a method for controlling secondary foam in a glass melt by reducing the amount of gas generated in the glass melt.

DISCLOSURE OF INVENTION

This need is met by the present invention wherein a method for forming a molten glass composition is provided. In accordance with a first embodiment of the present invention the method comprises the steps of providing a glass melting furnace having first and second melt regions, forming a molten glass composition in the first region of the glass melting furnace, passing the molten glass composition to the second melt region and providing an oxidizing agent to the molten glass composition in the second melt region. The oxidizing agent in the second melt region oxidizes the molten glass composition so as to minimize foaming of the molten glass composition in the second melt region.

The oxidizing agent may be a high temperature oxidizing agent. When using a high temperature oxidizing agent, it is preferably added to the molten glass composition in the first melt region. The first melt region is generally at a temperature of less than about 2400° F. and the second melt region is generally at a temperature of about 2600° F. or greater. The high temperature oxidizing agent is substantially inactive in the first melt region while being active and causing oxidation in the molten glass composition in the second melt region. Preferably, the high temperature oxidizing agent is cerium oxide or potassium permanganate.

The method may include the step of adding the oxidizing agent to the glass melting furnace in the second melt region. In such an instance, the oxidizing agent is preferably an oxidizing gas, and more preferably the oxidizing gas is selected from the group consisting of oxygen, air and steam. The oxidizing gas may be passed through the molten glass composition.

Accordingly, it is an object of the present invention to provide a method for forming a molten glass composition and controlling secondary foam in the molten glass composition. It is still another object of the present invention to control foaming in a molten glass composition by adding an oxidizing agent which is active in the higher temperature region of the glass melting furnace where secondary foam is a problem. Other objects and advantages of the invention will be apparent from the following description, the accompanying drawings, and the appended claims.

MODES FOR CARRYING OUT THE INVENTION

Figure 1:
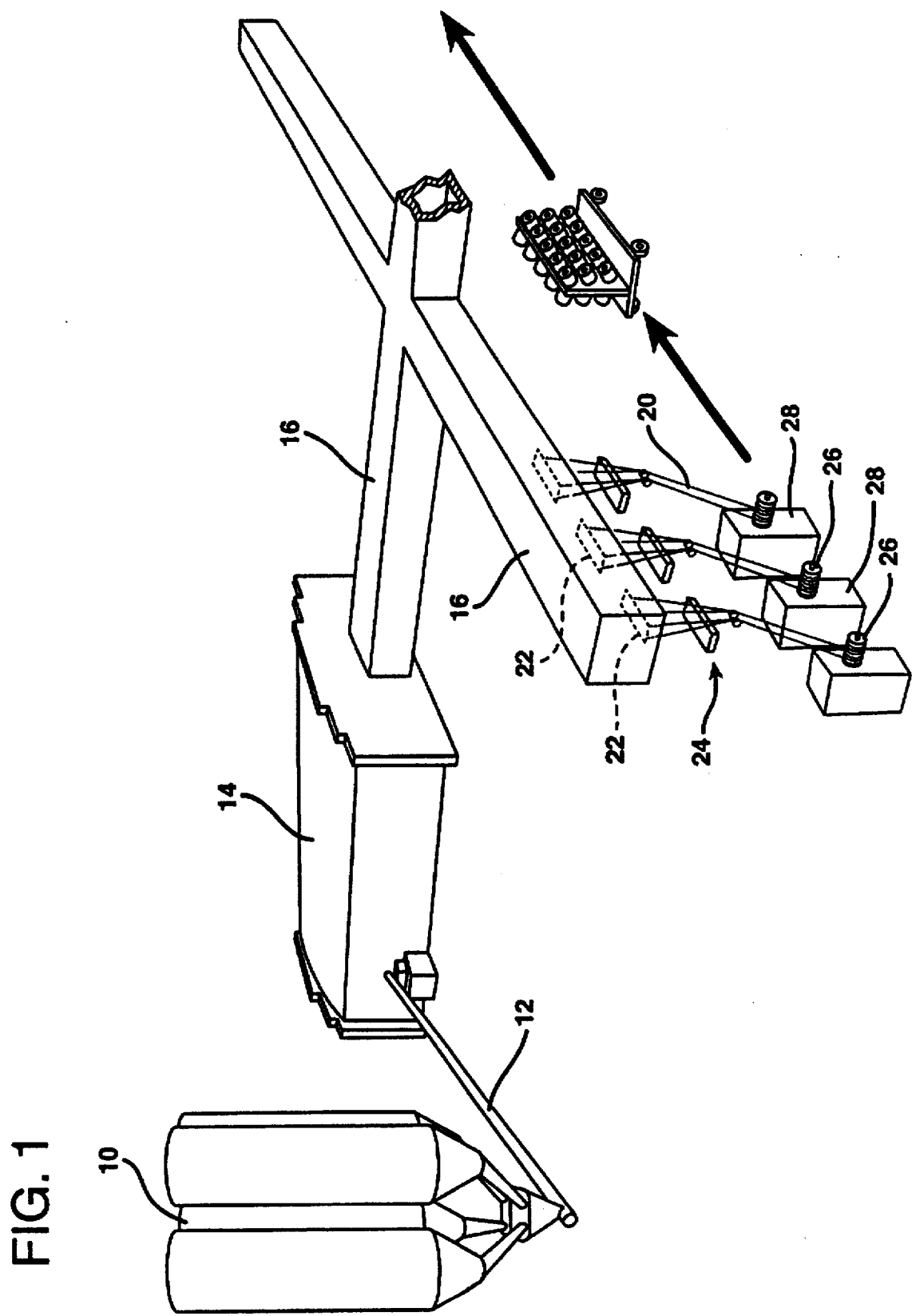
FIG. 1 is a schematic perspective view of a glass fiber production process including a hopper for supplying batch materials, a glass melting furnace, a forehearth and fiberizing stations.

The present invention will be described in reference to the accompanying figures. Referring to FIG. 1, the basic elements of a glass fiberization process are shown. The process comprises supplying batch raw materials from a hopper 10 via a supply line 12 to a glass melting furnace 14. Raw materials are melted and thoroughly mixed in furnace 14 to form a homogeneous molten glass composition. The molten glass composition is then passed to forehearth 16. Forehearth 16 distributes the molten glass composition to fiberizers.

The fiberizers may comprise most any fiberization technology as is well-known in the art of glass fiber manufacturing. The fiberizers may use rotary spinner technology as is well-known in the art wherein a multitude of short glass fibers are produced in a spinner. The fiberizers may also form the glass fibers by drawing a continuous glass fiber 20 from a bushing 22, passing the fiber 20 through a sizing applicator 24 and winding the continuous glass fibers 20 on a spool 26 in a winder 28, all of which is well-known to one of ordinary skill in the art. The spools of fiber may then be unloaded from the winders and transported.

Figure 2:
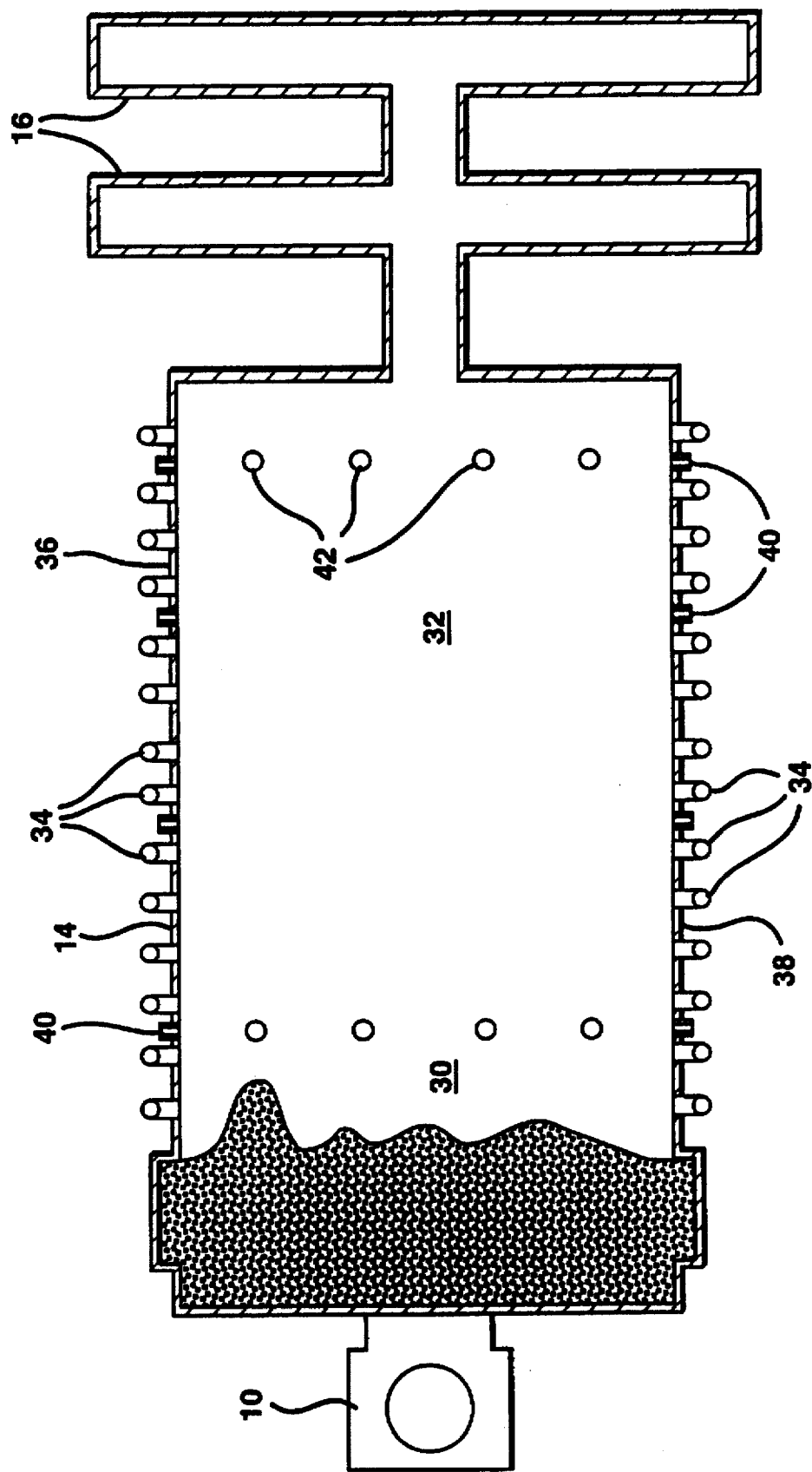
FIG. 2 is a cross-sectional top view of a glass melting furnace and forehearth.
Figure 3:
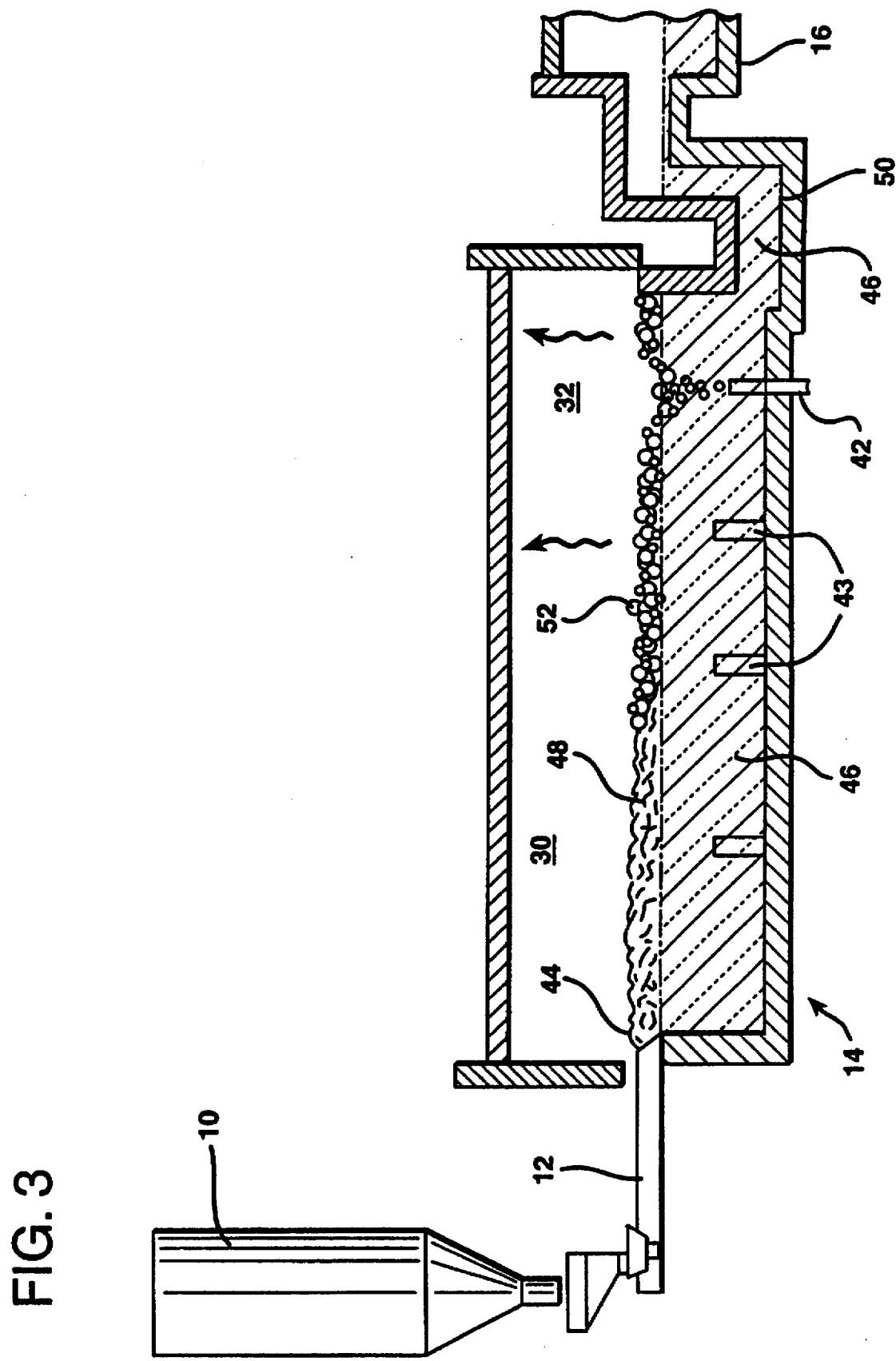
FIG. 3 is a cross-sectional side view of the glass melting furnace and forehearth of FIG. 2 including a glass melting process according to the present invention.

Turning now to FIGS. 2 and 3, the glass melting furnace 14 having a forehearth 16 is shown. Glass melting furnace 14 may be any standard glass melting furnace as is well-known in the art. Glass melting furnace 14 includes a rear or first melt region generally indicated at 30 and a front or second melt region generally indicated at 32. Glass melting furnace 14 also includes a number of gas burners 34 disposed along the sides, 36 and 38 respectively, of furnace 14 for heating the furnace. Electrodes (not shown) can also be provided at various locations throughout the furnace 14 for heating the glass composition. Peepholes 40 may be provided at various locations in sides 36 and 38 of furnace 14 to visually inspect or sample the molten glass composition.

A number of channels 42 or bubbles may be provided in various locations throughout both the first melt region 30 and the second melt region 32. Channels 42 allow a gas, such as an inert or oxidizing gas, to be passed through the glass composition and thereby provide a stirring effect and enhance homogenization of the molten glass composition. Electrodes 43 may be provided in furnace 14 to aid in heating the molten glass composition and also provide stirring effect.

Referring to FIG. 3, there is seen a cross-section of furnace 14 during a glass melting process. Batch materials 44 are fed to the furnace 14 from hopper 10 via supply line 12. Batch materials 44 may be in various forms such as powders, granules, etc. Batch materials 44 enter furnace 14 and mix with a molten glass composition 46. Molten glass composition 46 may be any suitable glass composition for the manufacture of glass fibers. Typically, glass fibers are produced from a class of glass known as "E" glass. E glass comprises from 52–56% of silica oxide or $SiO_2$, 12–16% of aluminum oxide or $Al_2O_3$, 16–25% calcium oxide or CaO; 0–6% magnesium oxide or MgO, 5–13% of boron oxide or $B_2O_3$, less than 1% of sodium or potassium oxides or $Na_2O$ and $K_2O$ respectively, and less than 0.75% of fluorine, iron oxide or $Fe_2O_3$, titanium oxide or $TiO_2$, strontium oxide or SrO, or lithium oxide or $Li_2O$. In addition, sodium or calcium sulfates are added in small mounts, typically less than 1%, so as to control the level of iron and carbon in the molten glass composition 46.

Batch materials 44 enter molten glass composition 46 in the first melt region 30 of furnace 14. First melt region 30 acts to melt batch materials 44 into molten glass composition 46. First melt region 30 typically is maintained at a temperature of less than about 2400° F. (1315° C.). Partially dissolved batch materials 44 lay on the surface of molten glass composition 46 until dissolved or mixed into molten glass composition 46 creating a primary foam 48 of undissolved batch materials 44 and gases, first melt region 30 is the portion of furnace 14 where batch materials 44 are melted and primary foam 48 is present. Second melt region 32 then begins at the point in furnace 14 where primary foam 48 ends.

In the continuous melting process, molten glass composition 46 passes from the first melt region 30 to the second melt region 32 of furnace 14. Batch materials 44 are completely melted in second melt region 32 and the molten glass composition 46 becomes homogenized. Second melt region 32 is maintained at a higher temperature than first melt region 30. Thus, there is an increasing temperature gradient from first melt region 30 to second melt region 32. Second melt region 32 is typically held at temperatures of about 2600° F. (1426° C.) or higher. The higher temperature of second melt region 32 provides for a flow of molten glass composition 46 from first melt region 30 to second melt region 32 and into forehearth entry 50. Molten glass composition 46 then flows from forehearth entry 50 into forehearth 16 for distribution into fiberizers as shown in FIG. 1. As molten glass composition 46 flows into second melt region 32, a secondary foam 52 is formed on the surface of the molten glass composition 46.

While not wishing to be bound by any one particular theory, it is believed that secondary foam 52 is formed from gas entrained in molten glass composition 46 being released from the molten glass. During the melt of batch materials 44 in first melt region 30, sulfate compounds are added to control the amount of iron ($Fe^{2+}$) and carbon in the melt. When molten, the sulfate compounds form a sulfur dioxide gas, $SO_2$ which becomes entrained in the molten glass composition 46. When molten glass composition 46 flows into the higher temperature second melt region 32, the solubility of the entrained gas is lowered due to the higher temperatures in second melt region 32. As a result, the entrained gas evolves from the molten glass composition 46 contributing to the secondary foam 52 on the surface of the molten glass composition 46.

Secondary foam 52 must be controlled or minimized to as low a level as possible in second melt region 32. The presence of secondary foam 52 makes the heating of molten glass composition 46 in second melt region 32 more difficult as heat must first penetrate secondary foam 52. Thus, the increasing temperature gradient from first melt region 30 to second melt region 32 necessary for proper glass flow into forehearth 16 is more difficult to maintain. Therefore, secondary foam 52 is preferably substantially eliminated.

According to the method of the present invention, secondary foam 52 is minimized or controlled during the formation of molten glass composition 46 by providing an oxidizing agent in the second melt region 32. The addition of an oxidizing agent to the second melt region 32 provides a more oxidized molten glass composition 46 in the second melt region 32. $SO_2$ gas, which is believed to highly contribute to the amount or volume of secondary foam 52, has an increased solubility in a more oxidized glass composition. Therefore, the greater the level of oxidation in molten glass composition 46, the greater the solubility of $SO_2$ gas. As a result, the amount or volume of secondary foam 52 is controlled or minimized.

An oxidizing agent may be supplied to second melt region 32 by the direct addition of the oxidation agent to the second melt region 32. While the oxidizing agent added directly to second melt region 32 may be a solid compound, the oxidizing agent is preferably an oxidizing gas. More preferably, the oxidizing gas is selected from the group consisting of oxygen, air and steam. However, one of ordinary skill in the art will recognize that other oxidizing gases may also be employed without departing from the scope of the invention. The oxidizing gas may be blown into the second melt region 32 of furnace 14 or is preferably added by passing the oxidizing gas through the molten glass composition via various means common in the art such as bubbling through channels 42.

Preferably, the oxidizing agent is a high temperature oxidizing agent. A high temperature oxidizing agent is one which is inactive at the lower temperature of first melt region 30, i.e., inactive at temperatures of less than about 2400° F. (1315° C.), yet is active at the higher temperatures in second melt region 32, i.e., about 2600° F. (1426° C.) and above. By inactive, it is intended that the oxidizing agent does not decompose and/or release oxygen groups to the molten glass composition 46. By active, it is intended that the oxidizing agent decomposes and releases oxygen to the melt for increasing the solubility of any entrained gas in the melt.

The high temperature oxidizing agent may alternatively be added to the molten glass composition 46 in first melt region 30 in conjunction with batch materials 44. The high temperature oxidizing agent does not decompose in this lower temperature region and thus, is substantially inactive in first melt region 30. As molten glass composition 46 passes into second melt region 32, the high temperature oxidizing agent decomposes thereby releasing oxygen into the molten composition. This creates the more oxidized molten glass composition 46 and minimizes formation of secondary foam 52. Preferably, the high temperature oxidizing agent is cerium oxide or potassium permanganate.

Having described the invention in detail and by reference to the preferred embodiment thereof, it will be apparent that modifications and variations are possible without departing from the scope of the invention which is defined in the appended claims.

I claim:

1. A method for forming a molten glass composition comprising the steps of:

providing a glass melting furnace having first and second melt regions;

forming a molten glass composition in said first region of said glass melting furnace;

passing said molten glass composition to said second melt region; and providing an oxidizing agent to said molten glass composition in said second melt region to oxidize said molten glass composition so as to minimize foaming of said molten glass composition in said second melt region.

2. The method as claimed in claim 1 wherein said oxidizing agent is a high temperature oxidizing agent.

3. The method as claimed in claim 2 wherein said high temperature oxidizing agent is added to said molten glass composition in said first melt region.

4. The method as claimed in claim 3 wherein said first melt region is at a temperature of less than about 2400° F. and said second melt region is at a temperature of about 2600° F. or greater, said high temperature oxidizing agent being substantially inactive in said first melt region while being active and oxidizing said glass composition in said second melt region.

5. The method as claimed in claim 2 wherein said high temperature oxidizing agent is cerium oxide or potassium permanganate.

6. The method as claimed in claim 1 wherein the step of providing said oxidizing agent comprises providing said oxidizing agent directly to said second melt region.

7. The method as claimed in claim 6 wherein said oxidizing agent is an oxidizing gas.

8. The method as claimed in claim 7 wherein said oxidizing gas is selected from the group consisting of oxygen, air and steam.

9. The method as claimed in claim 7 further comprising the step of passing said oxidizing gas through said molten glass composition.

10. A method for forming a molten glass composition comprising the steps of:

providing a glass melting furnace having a first melt region and a second melt region, said second melt region having a temperature which is greater than the temperature in said first melt region;

forming a molten glass composition in said first melt region of said glass melting furnace;

passing said molten glass composition to said second melt region of said glass melting furnace; and providing an oxidizing agent in said second melt region of said glass melting furnace to oxidize said molten glass composition in said second melt region of said glass melting furnace so as to minimize foaming of said molten glass composition in said second melt region.

11. The method as claimed in claim 10 wherein said oxidizing agent is a high temperature oxidizing agent.

12. The method as claimed in claim 11 wherein said high temperature oxidizing agent is added to said molten glass composition in said first melt region.

13. The method as claimed in claim 12 wherein said first melt region is at a temperature of less than about 2400° F. and said second melt region is at a temperature of about 2600° F. or greater, said high temperature oxidizing agent being substantially inactive in said first melt region while being active and effecting oxidation in said second melt region.

14. The method as claimed in claim 11 wherein said high temperature oxidizing agent is cerium oxide or potassium permanganate.

15. The method as claimed in claim 10 wherein the step of providing said oxidizing agent comprises providing said oxidizing agent directly to said second melt region.

16. The method as claimed in claim 15 wherein said oxidizing agent is an oxidizing gas.

17. The method as claimed in claim 16 wherein said oxidizing gas is selected from the group consisting of oxygen, air and steam.

18. The method as claimed in claim 16 further comprising the step of passing said oxidizing gas through said molten glass composition.

19. A method for reducing foam in a molten glass process comprising the steps of:

providing a glass melting furnace having a first melt region and a second melt region said second melt region having a temperature which is greater than the temperature in said first melt region;

forming a molten glass composition in said first melt region of said glass melting furnace;

providing an oxidizing agent to said molten glass composition in said first melt region said oxidizing agent being substantially inactive in said first melt region;

passing said molten glass composition to said second melt region of said glass melting furnace to activate said oxidizing agent; and oxidizing said molten glass composition in said second melt region of said glass melting furnace so as to minimize foaming of said molten glass composition in said second melt region.

20. The method as claimed in claim 19 wherein said oxidizing agent is a high temperature oxidizing agent comprising cerium oxide or potassium permanganate.

* * * * *